United States Patent
Verma

(10) Patent No.: US 10,210,280 B2
(45) Date of Patent: Feb. 19, 2019

(54) IN-MEMORY DATABASE SEARCH OPTIMIZATION USING GRAPH COMMUNITY STRUCTURE

(71) Applicant: Sudhir Verma, Gurgaon (IN)

(72) Inventor: Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 1155 days.

(21) Appl. No.: 14/522,239

(22) Filed: Oct. 23, 2014

(65) Prior Publication Data

US 2016/0117414 A1 Apr. 28, 2016

(51) Int. Cl.
*G06F 17/30* (2006.01)

(52) U.S. Cl.
CPC .. *G06F 17/30958* (2013.01); *G06F 17/30312* (2013.01); *G06F 17/30501* (2013.01)

(58) Field of Classification Search
CPC ................................................ G06F 17/30958
USPC ......................................................... 707/798
See application file for complete search history.

(56) References Cited

U.S. PATENT DOCUMENTS

| | | | |
|---|---|---|---|
| 5,649,181 A | 7/1997 | French et al. | |
| 6,801,904 B2 | 10/2004 | Chaudhuri et al. | |
| 7,139,762 B2 | 11/2006 | Labarge et al. | |
| 7,680,782 B2 | 3/2010 | Ritter et al. | |
| 7,958,120 B2 | 6/2011 | Muntz et al. | |
| 8,032,499 B2 | 10/2011 | Faerber et al. | |
| 8,126,855 B2 | 2/2012 | Faerber et al. | |
| 8,326,810 B2 | 12/2012 | Faerber et al. | |
| 8,396,855 B2 * | 3/2013 | Aggarwal | G06K 9/00677 707/709 |

(Continued)

FOREIGN PATENT DOCUMENTS

| | | |
|---|---|---|
| CN | 102799940 A | 11/2012 |
| CN | 103208027 A | 7/2013 |

OTHER PUBLICATIONS

M.E.J. Newman; "Finding Community Structure in Networks Using the Eigenvectors of Matrices"; Department of Physics and Center for the Study of Complex Systems, University of Michigan, Ann Arbor; Jul. 2006; 22 pages.

(Continued)

*Primary Examiner* — Kimberly L Wilson

(74) *Attorney, Agent, or Firm* — Fountainhead Law Group P.C.

(57) ABSTRACT

Database searching is optimized utilizing a graph community structure. A graph is created from transaction data based upon adjacent value occurrences. This may be done by scanning transaction data from top to bottom, and creating an edge between a current index value and a previous index value. Next, algorithms identify communities in the graph to create a graph community structure. These communities comprise blocks of patterns of similar value-ids distributed in the transaction data. Scanning and transition indices may be created with an eye toward reducing memory usage and enhancing performance. Query searching is then executed in an efficient manner on a per-community basis. For example, exact queries, range queries, and/or "AND" queries may be executed more efficiently upon communities of records, skipping those not belonging to the same community. Embodiments are suited to search an in-memory database having large volumes of column-oriented data stored in RAM.

13 Claims, 11 Drawing Sheets

(56) References Cited

U.S. PATENT DOCUMENTS

| | | |
|---|---|---|
| 8,429,153 B2 | 4/2013 | Birdwell et al. |
| 8,446,842 B2 | 5/2013 | Cao et al. |
| 8,583,678 B2 | 11/2013 | Vainer et al. |
| 8,688,685 B2 | 4/2014 | Qin et al. |
| 8,768,927 B2 | 7/2014 | Yoon et al. |
| 2006/0036564 A1 | 2/2006 | Yan et al. |
| 2011/0138123 A1 | 6/2011 | Guarajada et al. |
| 2012/0259840 A1 | 10/2012 | Nica |
| 2014/0257922 A1* | 9/2014 | Jouhikainen ....... G06Q 30/0201 705/7.29 |

OTHER PUBLICATIONS

Vincent D. Blondel, et al.; "Fast Unfolding of Communities in Large Networks"; Department of Mathematical Engineering, Universite' catholique de Louvain; Jul. 2008; 12 pages.
U.S. Appl. No. 14/314,032, filed Jun. 25, 2014 (not yet published).
U.S. Appl. No. 14/098,706, filed Dec. 6, 2013 (not yet published).

\* cited by examiner

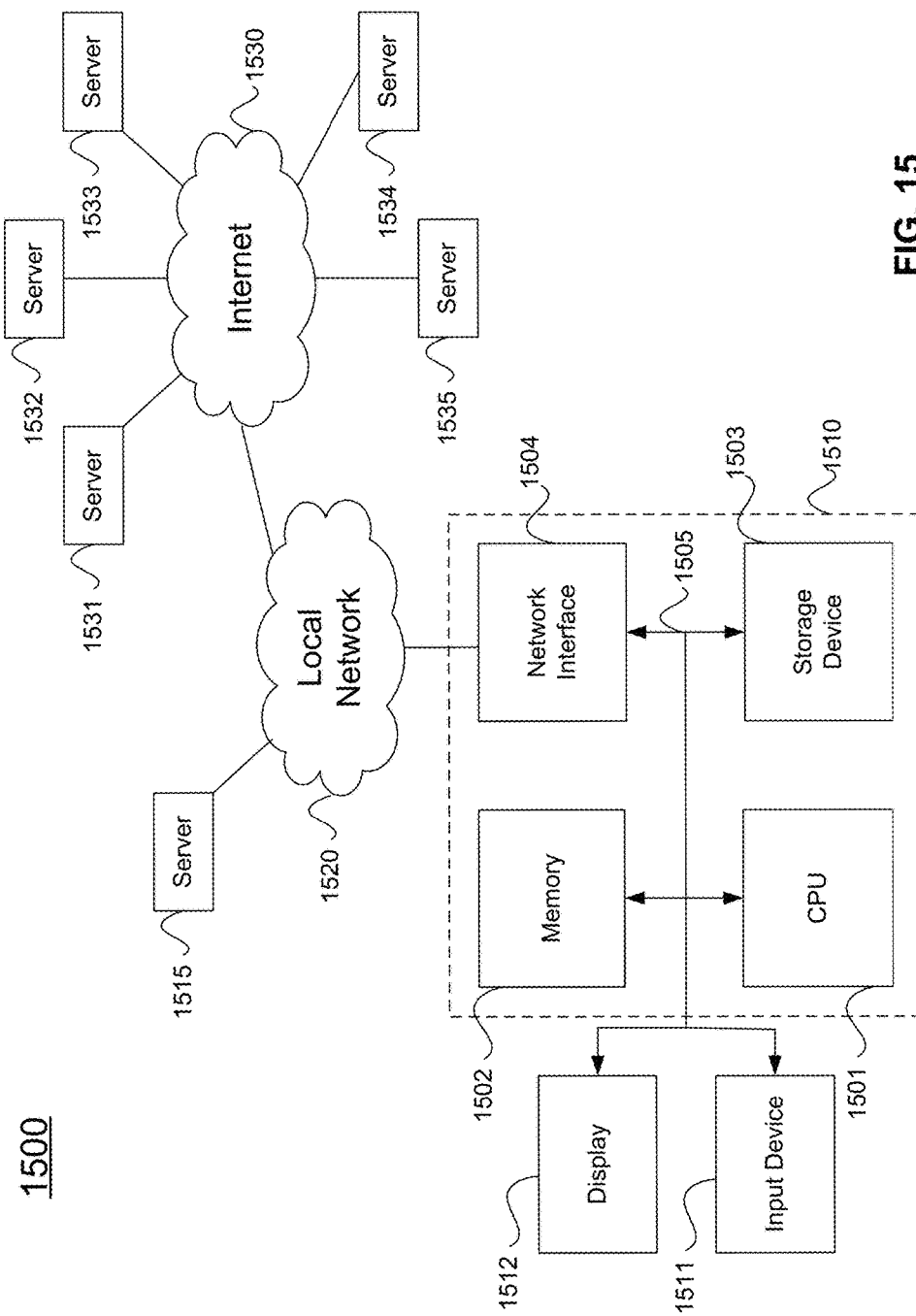

IN-MEMORY DATABASE SEARCH OPTIMIZATION USING GRAPH COMMUNITY STRUCTURE

BACKGROUND

Embodiments relate to database query searching, and in particular, to search optimization using a graph community structure. Unless otherwise indicated herein, the approaches described in this section are not prior art to the claims in this application and are not admitted to be prior art by inclusion in this section.

Database technology is evolving toward the use of in-memory column based database architectures. With such an in-memory database, large quantities of data are stored in random access memory (RAM), making that data available for rapid access and analysis for processing in response to queries posed by a database user.

However, the extremely voluminous data (e.g., possibly on the order of millions or even billions of records) present in such in-memory databases can consume large quantities of processing and memory resources. Searching of such in-memory data records in an efficient manner can significantly reduce the time and resources consumed in analyzing such large amounts of data.

SUMMARY

Database searching is optimized utilizing a graph community structure. First, a graph structure is created from transaction data based upon adjacent value occurrences. This may be done by scanning transaction data from top to bottom, and creating an edge between a current index value and a previous index value. Next, communities are detected within the graph to create a graph community structure. These communities comprise blocks of patterns of similar value-ids distributed within the transaction data. The scanning and transition indices may be created with an eye toward obtaining reduced memory usage and enhanced performance. Query searching may then be executed on a per-community basis in an efficient manner, skipping those records not belonging to the same community. For example, exact queries, range queries, and/or "AND" queries may be executed faster and more efficiently upon communities of records, rather than upon an entire corpus of data.

The graph community structure can be evaluated for memory usage and performance gain during searching. Embodiments thus may allow searching of database data with low memory overhead and avoiding processing-intensive steps such as sorting or adjusting existing database records. Particular embodiments may be suited to allow an in-memory database engine to efficiently search large volumes of column-oriented data stored in the RAM of an in-memory database.

An embodiment of a computer-implemented method comprises providing transaction data comprising a plurality of records in a database, generating a graph from the transaction data, and applying an algorithm to the graph to create a graph community structure. A plurality of communities is defined in the transaction data using the graph community structure. A database query is executed on records in a community, skipping records outside of the community.

An embodiment of a non-transitory computer readable storage medium embodies a computer program for performing a method comprising providing transaction data comprising a plurality of records in a database, generating a graph from the transaction data, and applying an algorithm to the graph to create a graph community structure. A plurality of communities are defined in the transaction data using the graph community structure. A community is evaluated based upon memory usage and/or performance gains versus searching value ids across multiple communities. A database query is executed on records in the community, skipping records outside of the community.

An embodiment of a computer system comprises one or more processors and a software program, executable on said computer system. The software program is configured to provide column-oriented transaction data comprising a plurality of records in a database, to generate a graph from the transaction data, and to apply an algorithm to the graph to create a graph community structure. The software is further configured to define a plurality of communities in the transaction data using the graph community structure, and to evaluate a community based upon memory usage and/or performance gains versus searching value ids across multiple communities. The software is also configured to execute a database query on records in the community, skipping records outside of the community.

In certain embodiments the graph is generated by identifying adjacent value occurrences in the transaction data, and creating an edge between a current index value and a previous index value.

In some embodiments the algorithm considers a modularity measure.

According to various embodiments the transaction data is column-oriented data.

In particular embodiments the database is an in-memory database.

In some embodiments the algorithm is applied by an engine of the in-memory database.

Embodiments may further comprise evaluating the community based upon memory usage and/or performance gains versus searching value ids across multiple communities.

In various embodiments the performance gains are in AND queries using intersecting attribute vector blocks of multiple columns.

The following detailed description and accompanying drawings provide a better understanding of the nature and advantages of embodiments.

BRIEF DESCRIPTION OF THE DRAWINGS

FIGS. 7-9 show transition indices in the case of different various communities, respectively.

FIG. 15 illustrates an example of a computer system.

DETAILED DESCRIPTION

Described herein are techniques for performing database searching according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Database searching is optimized utilizing a community graph structure. First, a graph structure is created from native transaction data based upon adjacent value occurrences. This may be done by scanning transaction data from top to bottom, and creating an edge between a current index value and a previous index value. Next, communities are detected in the graph to create a graph community structure is detected in the graph. These communities comprise blocks of patterns of similar value-ids that are distributed in the transaction data. Scanning and transition indices may be created as per the community structure for the transaction data. Then, without having to make changes or adjustments to the native database data, query searching is executed on a community basis in an efficient manner. For example, exact queries, range queries, and "AND" queries may be executed faster and more efficiently upon communities of records, skipping those not belonging to the same community.

Figure 1:
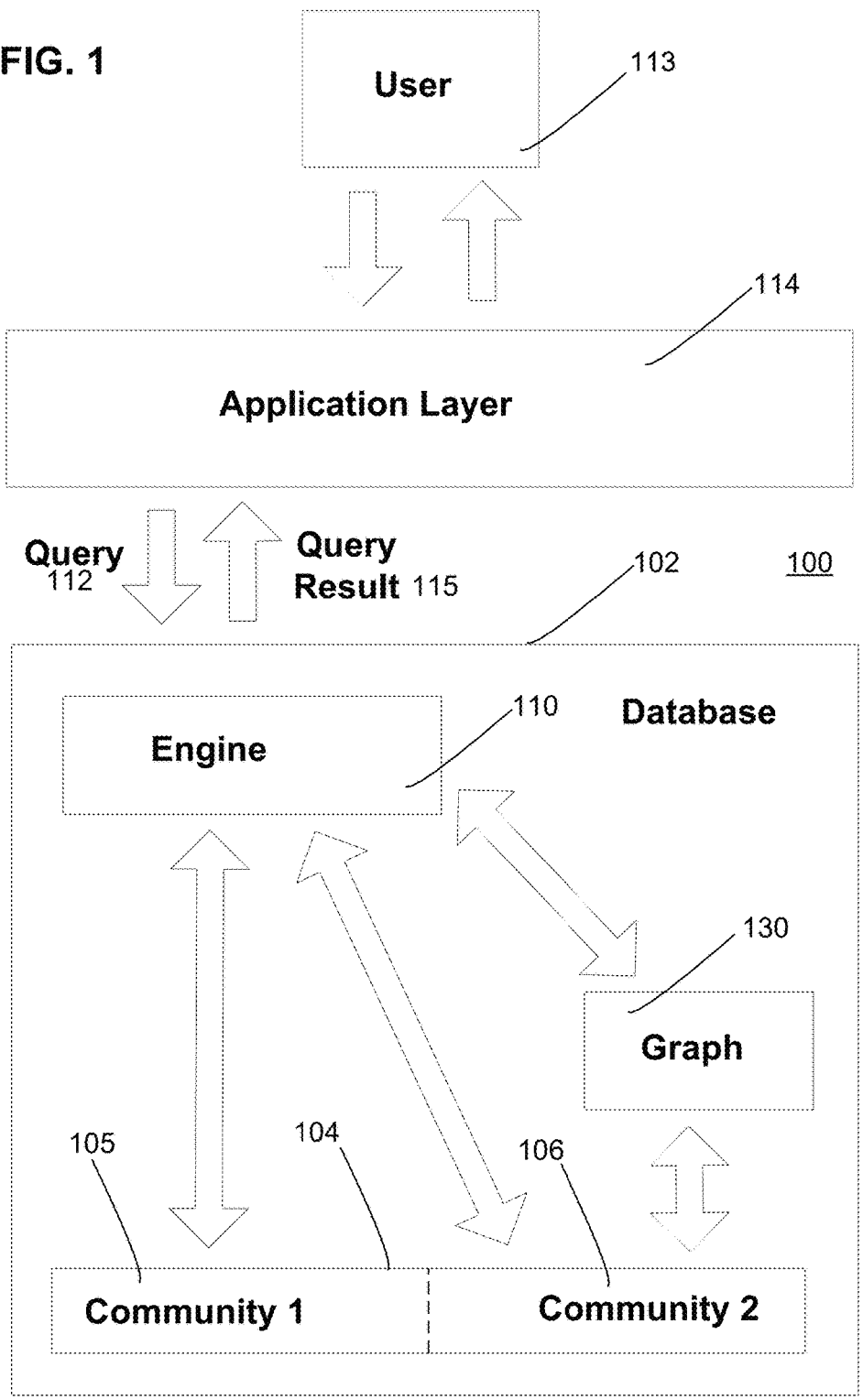
FIG. 1 is a simplified view of an embodiment of a system.

FIG. 1 is a simplified view illustrating a system according to an embodiment. Specifically, system 100 may comprise an in-memory database 102 including transaction data 104. This transaction data may also be referred to herein as an Attribute Vector (AV).

In certain embodiments, the transaction data may comprise column-oriented data. Such column oriented-data comprises two-dimensional (row/column) database table information mapped into a single dimension according to column (e.g., fields of a first column in sequence, followed by fields of a second column in sequence, etc.). This approach keeps like attributes of different entities together. For example, column-by-column storage may store all customer names first, then all customer addresses, and so on.

Column-oriented storage models are generally well-suited for analytical queries. The column-store format emphasizes the database column as the manipulable element, and is typically used for On-Line Analytical Processing (OLAP) of a subset of a total number of transactions (rows) over a fewer number of data types (columns) that may include aggregations of basic data types. A database table in the column-store format is typically used for interrogation and analysis of the raw data for purposes of problem-solving and planning that form a part of Business Intelligence (BI) efforts.

Other storage models are also possible. For example, row-oriented storage models may be suited for transactional queries. The row-store format emphasizes the database row as the manipulable element, and is typically used for On-Line Transaction Processing (OLTP) involving a relatively large number of on-line transactions (rows), with each transaction characterized by relatively larger data types (columns).

As shown in FIG. 1, the transaction data comprises communities 105 and 106. As described extensively herein, these data communities may be relied upon to enhance efficiency of searching the database. The process of identifying such smaller data communities within a larger corpus of data, is discussed in detail below.

The in-memory database of FIG. 1 further includes an engine 110 that is configured to receive a query 112 posed by a user 113 to an application layer 114. The engine processes the query on the transaction data, returning a query result 115 to the user via the application layer.

In particular, as described extensively herein, the engine is configured to process the query on a relevant community within the transaction data, rather than upon the entirety of the transaction data. By focusing analysis upon a relevant subset (i.e., community) within the transaction data, the engine can achieve efficiency in processing the query.

Specifically, embodiments find a set of unique strings and group them together such that they exist as neighbors (adjacent to each other) in the corresponding transaction data, dividing the data as equally as possible into communities without adjusting or re-arranging of records. Once the system has the known community of value identifiers (ids), it can scan the transaction data to find the location of these groups and store the information of the community block indexes. The benefit of such community/grouping is that it allows query searching to skip the records outside of the community while searching in the attribute vector (AV) or transaction data. In this manner patterns are found in transaction data, and those patterns are leveraged in terms of certain value-ids occurring together in order to gain performance.

Once the data pattern or community structure is recognized, this information can be stored for query search. Using the community structures (set of unique strings) the system will find the transition indexes, which are row indexes at which one community changes to another.

The in-memory database further comprises a graph 130. This graph 130 is created by the engine from the transaction data. The graph is utilized in the process of identifying and defining different communities of data present within the transaction data.

Figure 2:
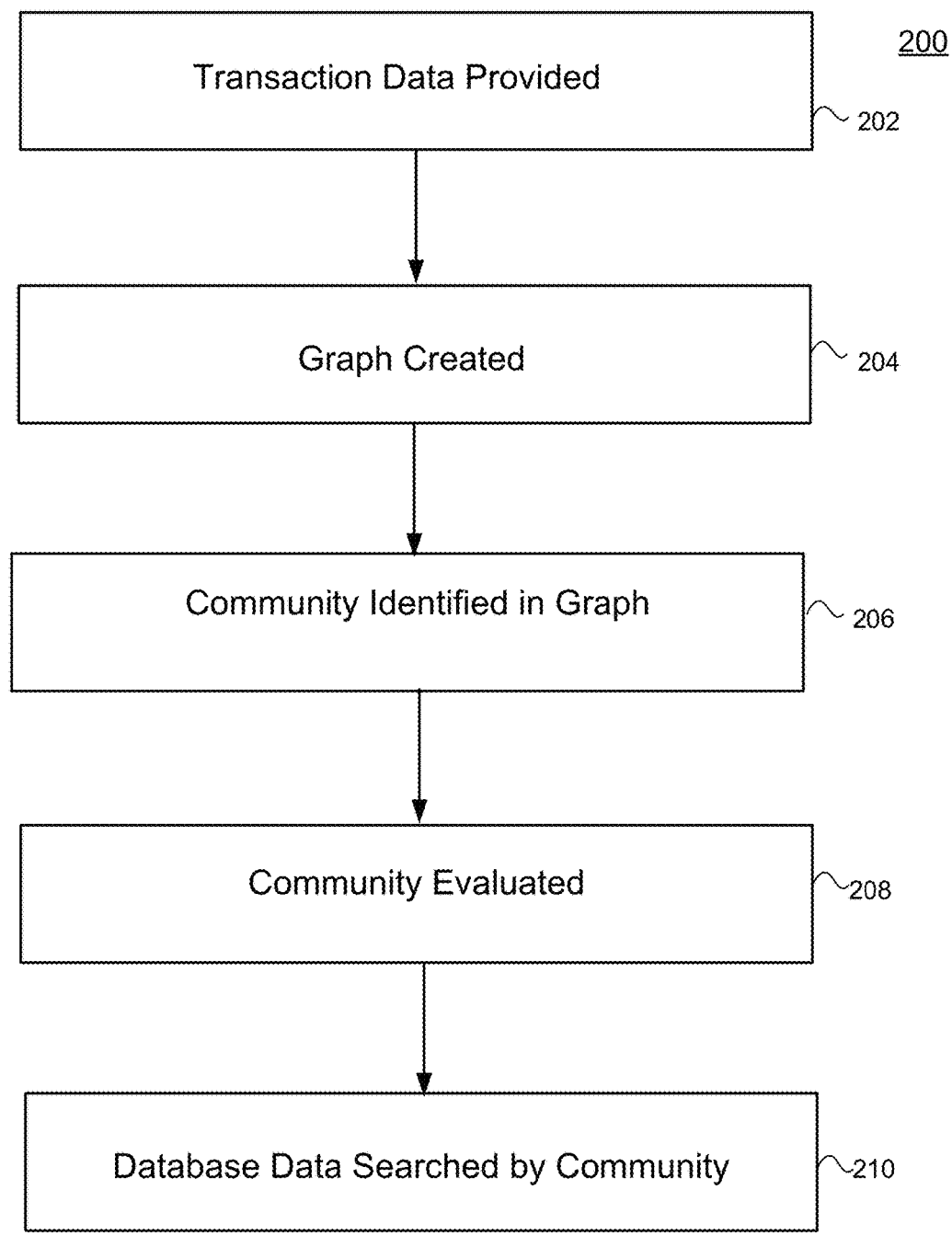
FIG. 2 is a simplified flow diagram of a process according to an embodiment.

FIG. 2 is a simplified flow diagram illustrating an embodiment of a process 200. In a first step 202, transaction data is provided in a database. In certain embodiments the database comprises an in-memory database, and the transaction data comprises column-oriented data.

In a second step 204, a graph is created from the transaction data. Further details regarding the creation of a graph are described below in the following example.

In a third step 206, a graph is referenced to create a graph community structure that identifies communities within the transaction data. In a fourth step 208, the identified communities may be evaluated from a memory consumption and/or processing speed standpoint.

In a fifth step 210, the transaction data is searched by community, in response to a query posed to the database. Records not within a relevant community are skipped (ignored) during this searching, thereby enhancing search throughput.

EXAMPLE

Details are now described in connection with a simplified example. Here, the native transaction table of the database is shown in FIG. 3 comprising eighteen (18) records that correspond to the following dictionary (collection of unique strings) of country names:

| | |
|---|---|
| 1 | America |
| 2 | England |
| 3 | France |
| 4 | Germany |
| 5 | India |

Conventionally, to find any particular id according to a query would require comparing all eighteen records. This can become burdensome where the number of records reaches into the millions or even billions.

Figures 3, 4:
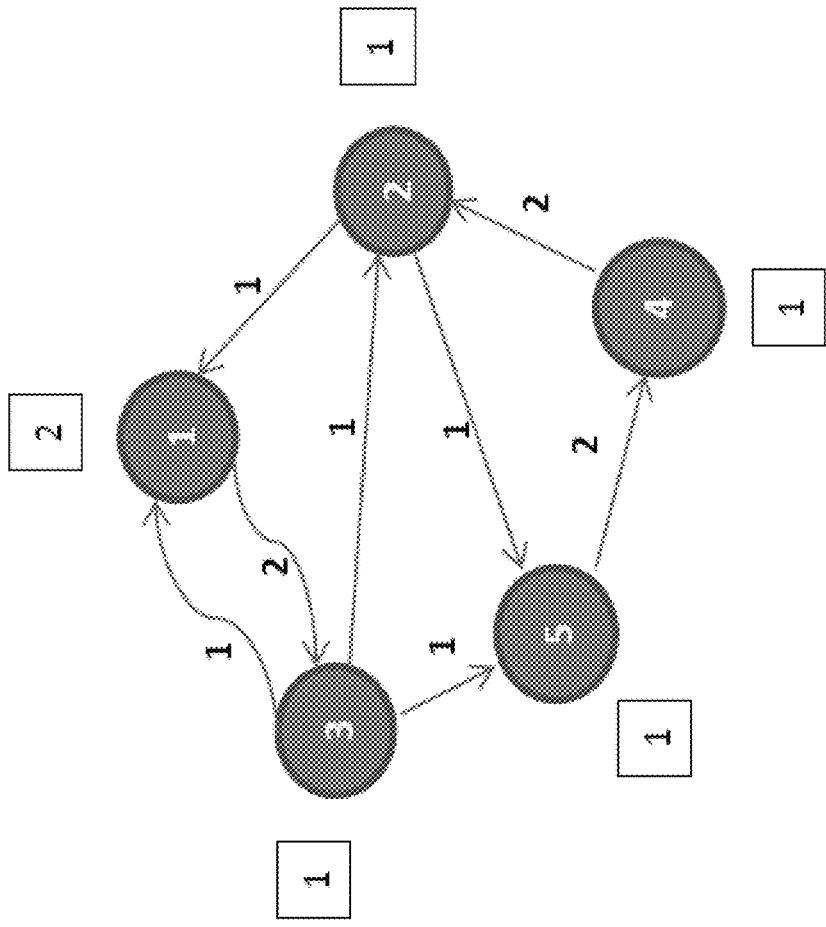
FIG. 3 illustrates a simplified example of native transaction data to be searched according to an embodiment.
FIG. 4 is a view of a graph created from the transaction data of FIG. 3.

Instead, according to embodiments the native transaction data of FIG. 3 may be encoded into communities. Searching of data in response to a query posed by a user, may then be accomplished in an efficient manner based upon these communities.

In particular embodiments, a first step of this process comprises creating a graph from the native transaction data. The identification of communities may then be treated as a directed graph/network problem.

FIG. 4 is a simplified view of a graph that is created from the transaction data of FIG. 3. Specifically, the value-id (unique string) is mapped to nodes, and the adjacent/neighboring values ids in the transactional data column are converted into edges. The weight of the links/edges is assigned as a number of times it occurs. Once the graph is created, a variety of algorithms may then be employed to detect the communities and solve the problem of finding the well-connected nodes with minimum number of edges to be removed.

Details regarding graph creation are now discussed. The graph of FIG. 4 is created with nodes being the value-ids and edges connecting two adjacent value-ids in the Attribute Vector (AV)—the transaction data of a column. The number/weight on the edge represents the number of times nodes were found adjacent to each other in the AV shown in FIG. 4.

The following summarizes the steps in creating the graph of FIG. 4:
1. create a graph with node being the dictionary id;
2. edges are the occurrence of two dictionary value id's adjacent to each other;
3. weight on the edge represents the number of occurrences of two dictionary ids adjacent to each other in the transaction data.

Thus the graph of FIG. 4 shows the representation of eighteen (18) records which are represented by eight (8) edges. The number marked on the line connecting two nodes represents repetition occurrence. For simplicity of illustration, the order of node occurrence is represented once in FIG. 4 between 1 to 3 node, but is not shown for other cases.

The graph of FIG. 4 also shows five (5) node edges to self. This is the number given in the square block near the node.

Thus the graph of FIG. 4 shows 2 and 1 on the edge connecting node 3 to node 1 (or node 1 to node 3). This is because the AV array example of FIG. 3 shows this occurrence three times (index 2 & 3, 3 & 4, and 11 & 12).

The total number of nodes in the graph of FIG. 4 is same as the number of records of the in-memory dictionary (number of unique strings). The total number of edges in the graph of FIG. 4 is one less than AV Size (total number of transactional data records, considering the self-loop edge). The AV is scanned once to create the graph.

A graph creation algorithm may be summarized as follows.
1. Start scanning the AV from top to bottom.
2. Create or increase the edge weight. An edge is created when one does not exist between a current index value of the AV and the previous index value.
3. Stop scanning when a scan index reaches the bottom of the AV.

As mentioned before, once a graph is created, it can be used to define communities useful for efficient searching. Such community definition is now discussed in a simplified manner in connection with the transaction data of FIG. 3.

In one approach, the native transaction data of FIG. 3 may be encoded into the following two communities: America/France, and England/Germany/India.

| | |
|---|---|
| 0 | 1, 3 |
| 1 | 2, 4, 5 |

This may also be expressed as:

| | | |
|---|---|---|
| 0 | 1 | America |
| 1 | 2 | England |
| 0 | 3 | France |
| 1 | 4 | Germany |
| 1 | 5 | India |

Figures 5, 6:
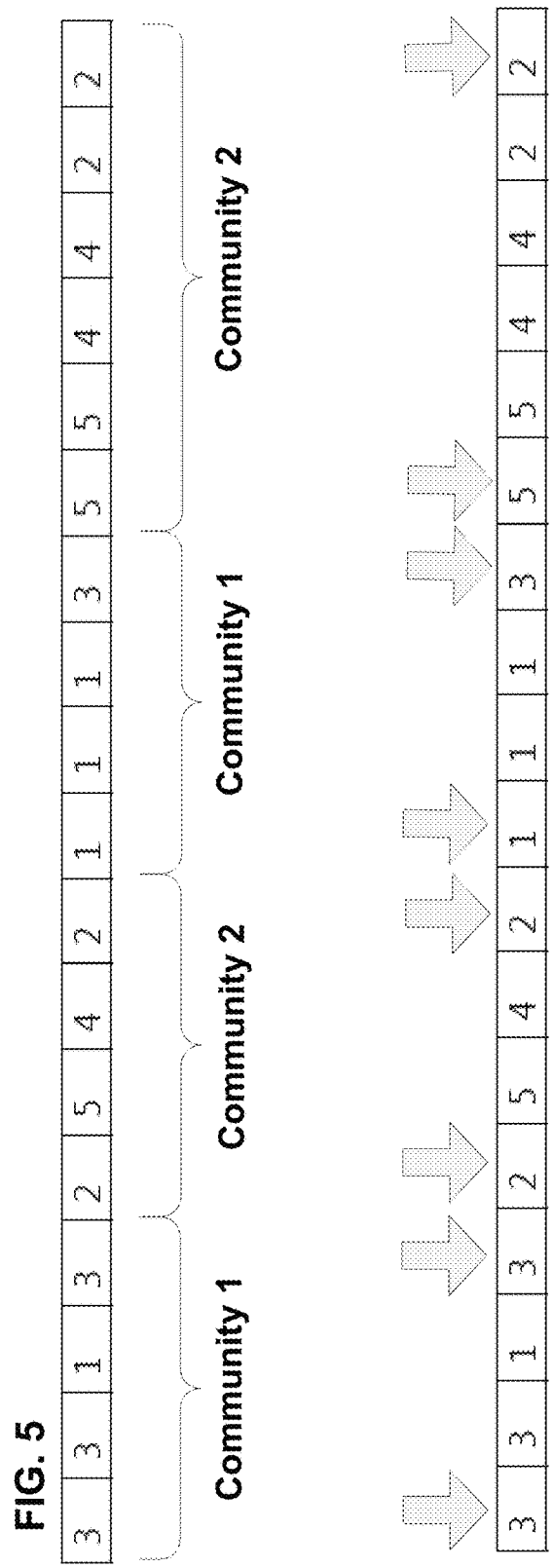
FIG. 5 depicts the native transaction data grouped according to communities.
FIG. 6 shows transitions between the communities of FIG. 5.

In the above, bit 0 represents one community, and bit 1 represents the second community. FIG. 5 depicts the native transaction data grouped according to these communities.

From FIG. 5, the transitions between communities are shown with downward arrows ↓ in FIG. 6. Accordingly, transition indexes defining these two communities may be stored as follows:

| | |
|---|---|
| 0 | <1, 4>, <9, 12> |
| 1 | <5, 8>, <13, 18> | where <a, b> represent:
a—Start address in AV;
b—End address in AV; and
bit 0 and 1 represent the community/group they belong to.

After the creation of above details, it is fairly straightforward for the system to search the transaction data in an efficient manner, avoiding the necessity of processing all eighteen records. Consider for example, an exact query search for 'India'.

First, the dictionary is searched and the community structure that "India" belongs to, is read. Here that community structure is 1.

A next step is to look into the transition index, and directly jump to the address where the unique string of this community exists, skipping all the other records. Here, this corresponds to the addresses <5, 8> and <13, 16>.

Similar gains in efficiency can be achieved in a range query search, once it is identified which communities those ranges belong to. For an 'AND' query search, a two phase approach may be used. A first step may be to check if blocks have intersections. Then, only intersected rows are searched.

A challenge is to find the community or group of value-ids (unique strings) which minimizes the transition index, and which also divides the transaction data into communities comprising approximately equal numbers of records. Thus for a given query it optimizes equally in terms of searching in relevant blocks.

This challenge can be defined as follows.
Find the best connected communities or set of value-ids (unique strings) in the transactional data.
Find the community in such a way that divides them into nearly equal shares of value-ids.
Minimize the memory needed to store transition indexes.

The main idea is to find the group of ids which could potentially lead to skipping of records in a most efficient fashion. Such a problem can be divided into the following stages.

i) Finding the number of community or group that the dictionary can be split into.

ii) Finding a combination of dictionary ids (unique strings) which minimizes the transition index in the AV and divides the AV into communities of roughly a same size.

To elaborate upon problem i), in the transaction data shown in FIG. 3, various community divisions are possible. One split has been discussed detail already—where 1 & 3 belong to one community and 2, 4, & 5 belong to a second community.

Other community divisions, however, are possible. One alternative option could be to divide into three groups, with 1 in one community, 2 & 3 in the second community, and 4 & 5 in the third community.

This problem can be solved by evaluating the choice by scanning through the AV for the transition points for these groups.

In an example, the AV of FIG. 3 may be scanned to check the transition index count in the AV. The transition index is the index at which the community group changes.

Figures 7, 8, 9:
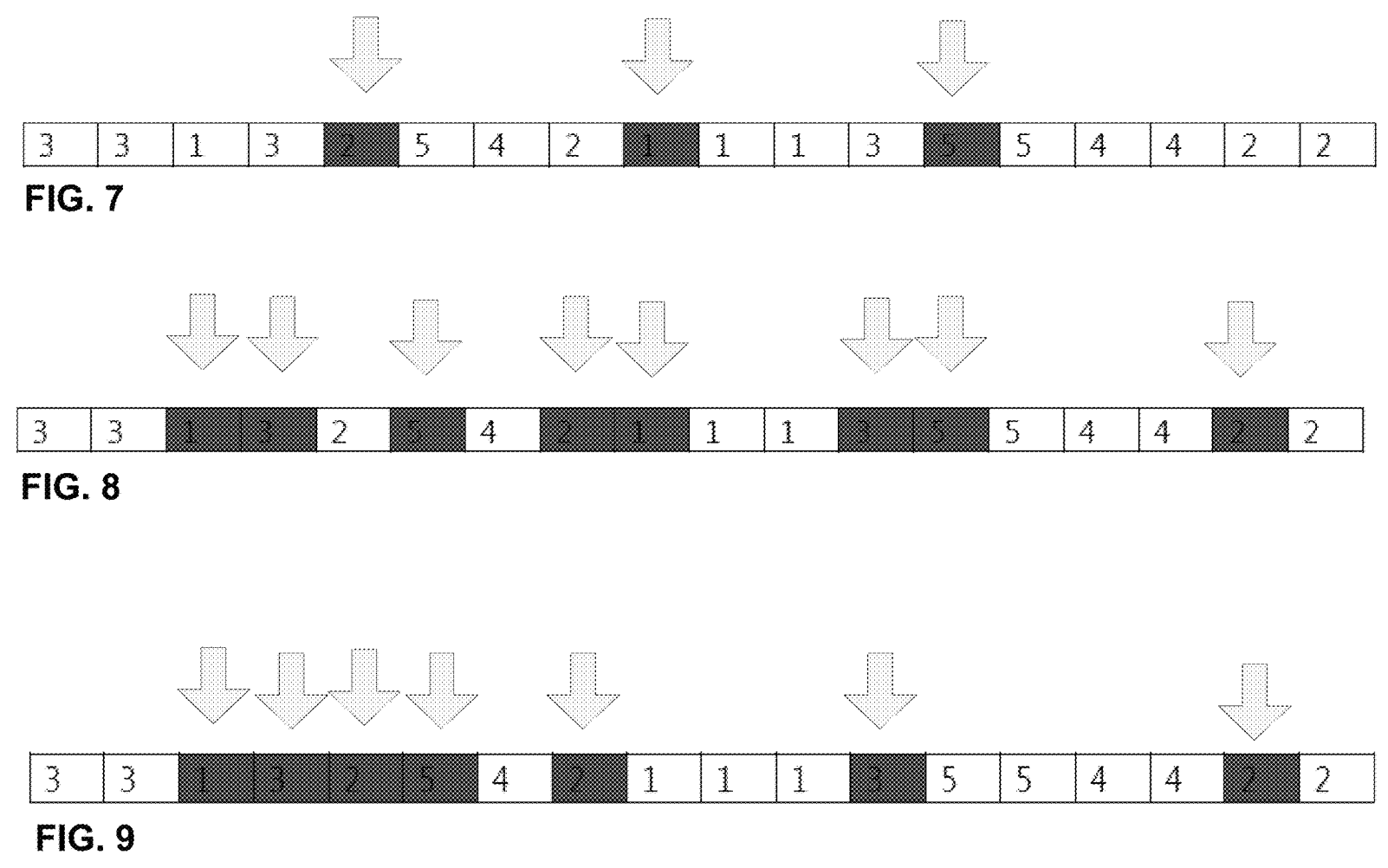

As shown in FIG. 7, in the case of two communities, three (3) transition indices are found. As shown in FIG. 8, in the case of three communities, eight (8) transition indexes are found.

From the above examples, it is clear that having two communities offers the minimum number of transition indexes. These communities tend to use the least space in storing the information.

With a two-community approach, an alternative division could have been between 1 & 2 and 3, 4, & 5. As shown in FIG. 9 this leads to seven (7) transition indices, which is less desirable.

Having a minimum number of transition points is not an absolute criteria for community selection. Other criteria can be considered, for example the benefit of memory saved for scanning versus the memory utilized. Where, however, the system finds an increased number of communities to lie outside the limit of memory specified, fewer communities may be selected in order to improve the search performance with more records to skip and less memory to read.

To find communities in a graph, a graph community structure algorithm may be employed. Such an algorithm may use a modularity measure defined as in the following equation:

$$Q = \frac{1}{2m} \sum_{i,j} \left[ A_{ij} - \frac{k_i k_j}{2m} \right] \delta(c_i, c_j),$$

where:
Q is the modularity measure.
$A_{ij}$ represents the weight of the edge between i and j nodes.
$k_i$ represents degree (including weights) or sum of the weights of edges attached with node i.
So this can also be written as $k_i = \Sigma_j A_{ij}$
$c_i$ is the community to which node i is assigned or attached.

$\delta(c_i, c_j)$ function returns 1 when both node are in same community and 0 otherwise.
m is the number of edges in the graph, which in this case would be AV Size-1 (one less than number of records).

Various algorithms may be applied to a graph network in order to determine an appropriate community structure within the graph network for each column. One example of a community finding algorithm is described by Blondel et al. in "Fast Unfolding of communities in large networks" Journal of Statistical Mechanics: Theory and Experiment—P10008 (2008), which is incorporated by reference herein for all purposes. This approach proposes a hierarchical way of finding the approximate solution which provides good community structure with high performance (the algorithm quickly finds the solution for large networks). Here, the nodes are combined together if the result ends up with increasing/maximizing the modularity measure. After all the nodes are combined the new network is created by grouping the entire node within communities as one node for new network and connecting other new nodes from the links of older nodes to other community nodes. This process continues to form bigger communities in each step and stops when modularity cannot be improved further.

Another possible algorithm is disclosed by M. E. J. Newman in "Finding community structure in networks using the eigenvectors of matrices", Phys. Rev. E 74, 036104 (2006). That paper is also incorporated by reference herein for all purposes.

Algorithms may use a modularity measure as the way to compare the quality of communities. This graph community finding problem is known, and the algorithms provide approximation techniques which furnish good results in terms of finding the connected group of nodes and detecting the best communities. The main idea behind these algorithms is to find sizeable community (a community with good numbers of nodes belonging to it), instead of making one big single community. This works well for optimizing columns, since distributing similar numbers of value-ids within each community could potentially lead to equal distribution of AV records across communities.

Figure 10:
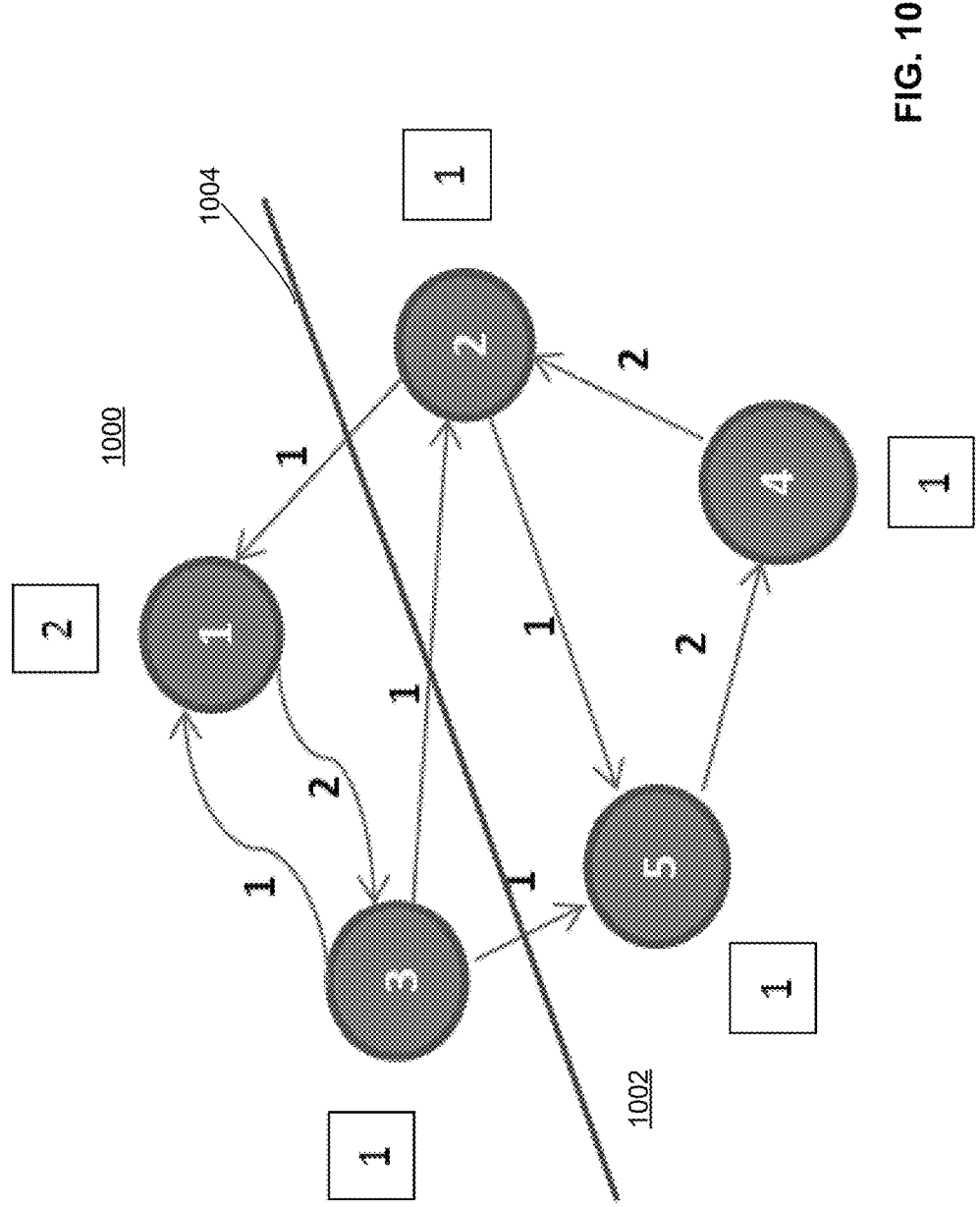
FIG. 10 shows splitting of the graph of FIG. 4 into two communities.

Returning to the transaction data of FIG. 3, FIG. 10 shows that the algorithm splits the graph of FIG. 4 into two communities: community 1000 having nodes 1 & 3, and community 1002 having 2, 4, & 5 nodes. The line 1004 shows the links which get broken to form these communities. In this case algorithm gets the total weight of 3, since each edge has a weight of one. This translates into three transition indexes for the transaction data.

The total weight of nodes going across community is the transition indexes in the column is shown in the following equation.

$$\text{Total Transition Index} = \sum_{i,j} A_{ij} *! \delta(c_i, c_j)$$

where:
! represents a "NOT" function.
The above methods sum the weights on the edges which are going across communities.

Once the total number of communities and total transition index have been obtained, the identified communities identified can be evaluated to see if they are favorable for going ahead with creation of the transition indexes information in the next step. In certain embodiments, such evaluation of candidate community structures may comprise looking into two aspects: overall memory required and performance gains.

For the memory aspect, the memory required for storing communities and transition indexes is calculated. This storage is the memory required at the dictionary level to indicate the community and memory required to store transition index for a given community.

$$D_{mem} = N * \log_2(C)$$

$$T_{mem_i} = \log_2(C) + 2 * \log_2(T) * T_i$$

$$O_T = D_{mem} + \Sigma_i T_{mem_i}$$

where:
'i' is the index used for community.
$D_{mem}$ is memory required by dictionary valueid for community encoding.
$T_{mem_i}$ is memory required to store the transition indexes with community information.
N is the total number of unique string in the dictionary.
C is the number of communities found using graph algorithm.
T is the total number of records in the AV (AV Size).
$T_i$ is the number of transition index found for the $i^{th}$ community.
$O_T$ is the total memory required for all communities. The system ensures that the $O_T$ is less than the threshold or configured memory for a column to accept the community structure.

Performance is another aspect of community evaluation. Performance gains for each community may be computed, and it is determined whether the solution is good for querying on any community and does not lead to higher search time (as compared to a complete AV scan). For a given community the total memory scan could be as follows:

$$O_i = \log_2(C) + 2 * \log_2(T) * T_i$$

$$A_i = \Sigma_j (E_j + 1 - S_j) * \log_2(N)$$

Total memory for search or scan for any value-id in $i^{th}$ community is $= O_i + A_i$.

From the above expression, the threshold for each community to be beneficial in case may be derived as follows:

$$(O_i + A_i) < T * \log_2(N)$$

where:
'i' is the community index;
'j' is the index on blocks of AV for community 'i' or array of memory addresses (start and end address) to scan;
T is the total number of records in the AV (AV Size).
$O_i$ is the memory taken by transition index list of community 'i';
$A_i$ is the AV memory scan for value id for community 'i' value id;
$T_i$ is the number of AV Blocks found in the column for $i^{th}$ community;
N is the total number of unique string in the dictionary;
$E_j$ is the end address for the AV for scan for the $j^{th}$ block of $i^{th}$ community; and
$S_j$ is the start address for the AV for scan for the $j^{th}$ block of $i^{th}$ community;

This is checked for each community. The communities may satisfy the above described condition for a given column to be optimized with this approach.

In implementation, an even increase of the instruction set (to look for community index) could be another cost. A simple AV scan is single for loop implementation, whereas the above approach might lead to more instruction sets to fetch AV Block and scan. This could be accounted for by adding it to the equation and checking the same in the following manner:

$$(1.15 * (O_i + A_i)) < T * \log_2(N)$$

As an example, in the above equation 15% of overall memory was increased to accommodate the increased instruction sets. The much approximate percentage or threshold can be derived with experimentations with the data.

Once the system clears the evaluation phase, the transition indexes are made permanent, and the dictionary is enhanced with added column of community identification using the bits required to encode the community.

Figure 11:
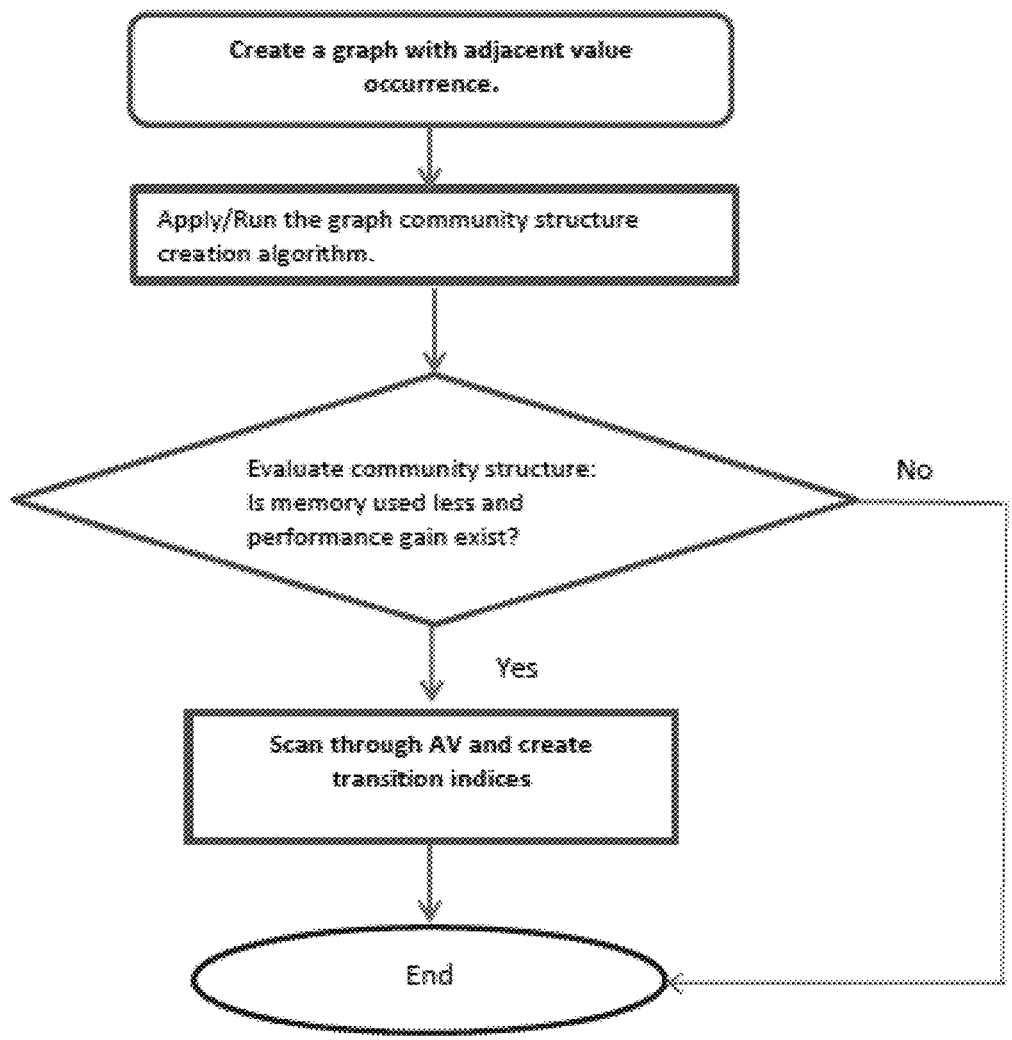
FIG. 11 shows a simplified version of a flow chart of a process according to an embodiment.

FIG. 11 shows a simplified version of a flow chart of the above described steps for the algorithm. The simplified flow diagram of FIG. 11 is simplified in that it omits further optimizing the community structures and improving the performance. For example after running the community identification algorithm, six 6 communities were found and this showed a gain in performance. Thus it is possible to find further performance gain by increasing or decreasing the number of communities.

Where it is desirable to increase a number of communities, the largest community may be selected and attempted to be split. The community structure formation algorithm may be redone by specifying the minimum number of communities to be formed.

Where it is desirable to decrease a number of communities, the smallest community may be selected and attempted to be merged with the nearest community. The community structure formation algorithm may be redone by specifying the maximum number of communities to be formed.

The system can check the impact of increasing or decreasing the number of communities by one.

Embodiments of search optimization using graph community structures may be particularly suited for implementation within an in-memory database architecture, and particularly for a column-oriented in-memory database. Examples of such in memory databases include but are not limited to the Microsoft Embedded SQL for C (ESQL/C) database available from Microsoft Corp. of Redmond, Wash.; and the Exalytics In-Memory database available from Oracle Corp. of Redwood Shores, Calif.

Figure 12:
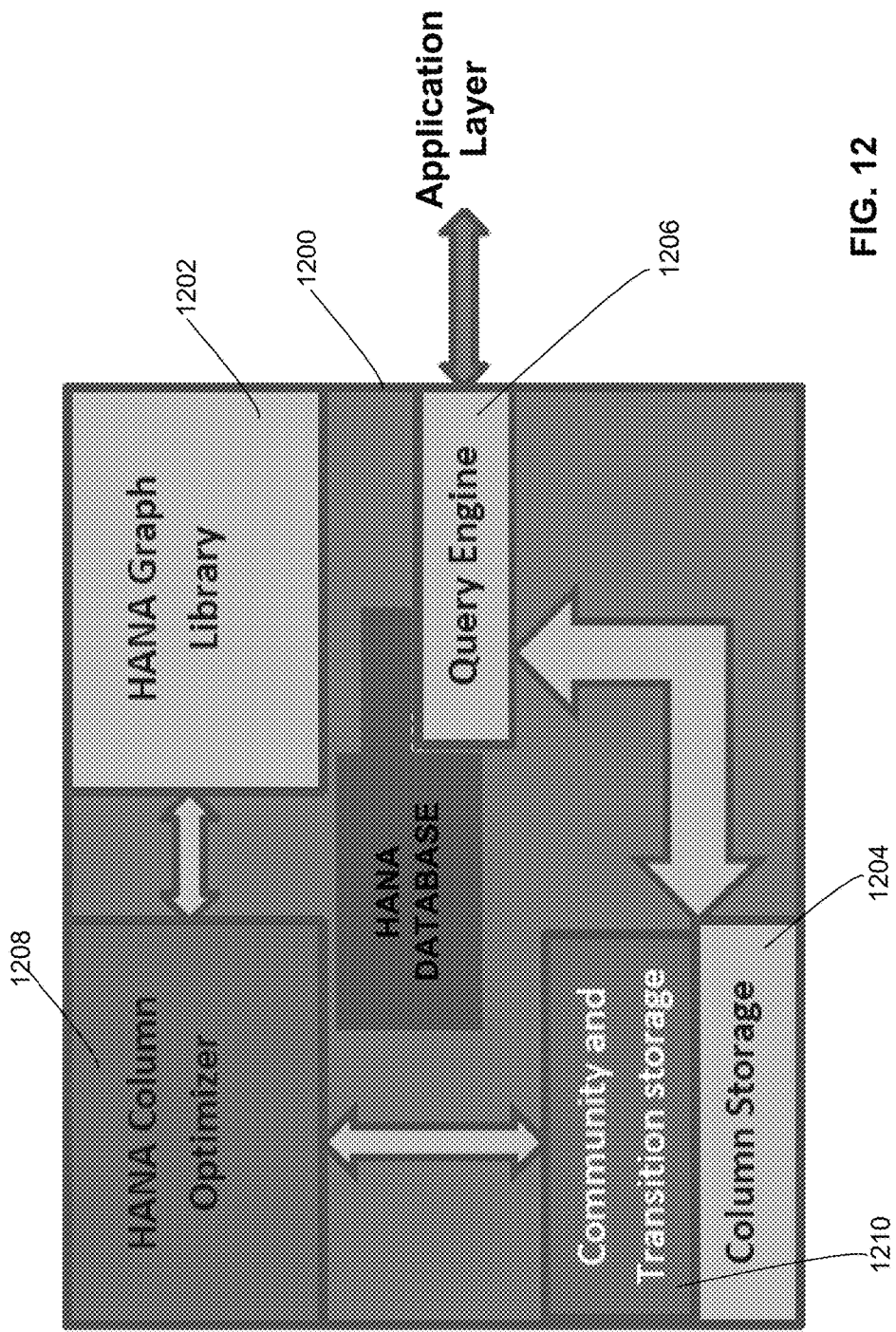
FIG. 12 shows a simplified view of the overall proposed component structure within one specific in-memory database architecture.

In a particular embodiment, the community graph based searching may be implemented within the HANA in-memory database platform available from SAP SE of Walldorf, Germany. FIG. 12 shows a simplified view of the overall proposed component structure within HANA database 1200.

In this specific implementation, the components 1202, 1204, 1206 represent existing elements of the HANA architecture. The boxes 1208 and 1210 are enhancements to the HANA existing architecture.

During the query search stage, the community structure and transition data is leveraged to only scan the relevant region of transaction table. HANA Column optimizer 1208 is embedded within HANA database which utilizes the HANA graph library for detecting the community structure for each column, and will create community structure and transition storage for each column.

The new community and transition index information is stored within the HANA database along with column stores and HANA dictionary. The HANA query engine leverages the new community structures and transition indexes for the search queries.

The graph community detection approach captures the data distribution of grouped elements, and provides greater performance boosts to search queries in such cases. For example, in a global company different time-zones produce this kind of data. Like-countries clustering in Asia, Pacific, and Japan (APJ), Europe, Middle East, and Africa (EMEA), and the United States, can be observed for a transaction with a country's name falling as per local time.

Another example arises from the procurement cycles for a manufacturing firm or offices having a similar pattern every day. So, the transactions recorded would represent a pattern. Such patterns could be recognized and leveraged as communities in order to achieve efficiency of searching.

According to embodiments, the search optimization approach described above could be expanded to multiple columns. In particular, the community finding algorithm for a single column can be executed in parallel for multiple columns, and operate independent of those other columns.

In such an approach, each column detects its community structures and optimizes accordingly. This is a benefit of graph community detection, as it can be executed in parallel to reduce execution time while utilizing the power of multi-core hardware architecture.

According to still other embodiments, the graph community detection may be combined with other approaches. Examples include but are not limited to Prefix Encoding, Run Length Encoding (RLE), clustering algorithms, and sparse algorithms.

For example, Prefix length encoding may be combined with the graph community structure approach. First, the prefix length encoding is performed by getting the dominant value at the top of the column and compressing it by removing the dominant value. In a second step graph community algorithm can be applied to further optimize column for search.

Embodiments can combine to optimize RLE in a similar manner, by running the compression with RLE and latter applying the graph community structure algorithm to optimize the search on the AV.

Such hybrid/combined approaches may work well since existing compression techniques help in reducing the column transaction data or AV, and the graph community detecting provides the power of only searching through the relevant records. Desirable results can thus be achieved with compression and optimized searching of column queries.

Frequent updating may not be necessary. That is, during the delta merge time, it is not necessary to re-run and find new community structures. After substantial amount of data gets added or deleted, the system can start looking at re-running the graph algorithm and detecting new community structures. Until then, the same community structure gets applied and only transition indexes get updated, which is a fairly quick process.

Other possible embodiments may arise in the manner of creating the graph out of the column by considering adjacent value-id. A variation could be to do further look-ahead and consider next five or ten value-ids. One motivation could be to check if this could potentially help in creating a better community with a least number of transition indexes.

Under certain circumstances, a certain portion (set of records) may have randomly mixed value-ids across a community. This could lead to several transition indices for the system when trying to define the community.

Figure 13:
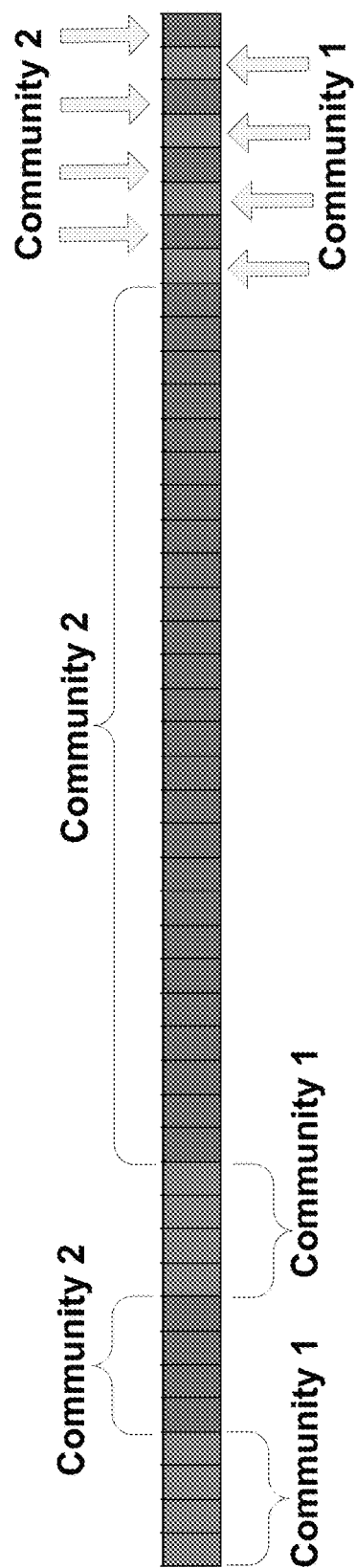
FIG. 13 shows transaction data divisible up into communities.

For example, FIG. 13 shows transaction data divisible up into a community 1 and a community 2. Here, the community finding algorithm would end up producing twelve (12) transition indices.

| | |
|---|---|
| 0 | <1, 4>, <9, 12>, <39, 39>, <41, 41>, <43, 43>, <45, 45> |
| 1 | <5, 8>, <13, 38>, <40, 40>, <42, 42>, <44, 44>, <46, 46> |

Eight (8) of these transition indices are created due to the frequent mixed records occurring across communities at the end portion of the attribute vector. This would lead to higher cost for searching for each community without much advantage in skipping single records and instead searching in transition indices table as well.

An alternative approach avoids creating transition indices for such segment, and instead terms those as "All Community" records. Accordingly, embodiments may include transition indices designating '0' as "All Community".

The idea would be to create an extra community called "All Community", and to group such mixed community records under this community. In this manner, fewer transition indices are created, and performance and memory are preserved in searching.

According to such an embodiment, query searching of a community would search the indices mentioned under the community they belong to, as well as in "All Community" ones.

With this approach, in the specific example of FIG. 13 the number of transition indices could be reduced to five, with a fifth being the "All Community" index. The following transition indices include those indicated with '0' as "All Community".

| | |
|---|---|
| 0 | <39, 46> |
| 1 | <1, 4>, <9, 12> |
| 2 | <5, 8>, <13, 38> |

Embodiments providing efficient searching utilizing the graph community detection approach, may offer one or more benefits over conventional query search approaches. One such benefit may be high performance of exact query, range query, and "AND" query search. This is due to the fact that only relevant community blocks, rather than the entire AV, are searched.

Another potential benefit is avoidance of the cost incurred by having to sort or adjust rows of a table during the search optimization. Instead, the rows are maintained in their current position, and simply skipped if not belonging to the appropriate community. Direct access of rows is also maintained.

Another potential benefit is that the community finding algorithm works independently for each column. It optimizes in varying fashion, because the community structure found in each of the column could vary.

In conclusion, embodiments leverage graph community structure detection approaches to identify the group of values ids (unique string) community, which are the patterns/distribution of blocks of value-ids in the transaction data (AV) without having to change or adjust existing records. Once the communities are identified, it becomes easier for the system to search exact query, range query and "AND" queries more quickly, by using the block information to skip records outside the identified community.

Figure 14:
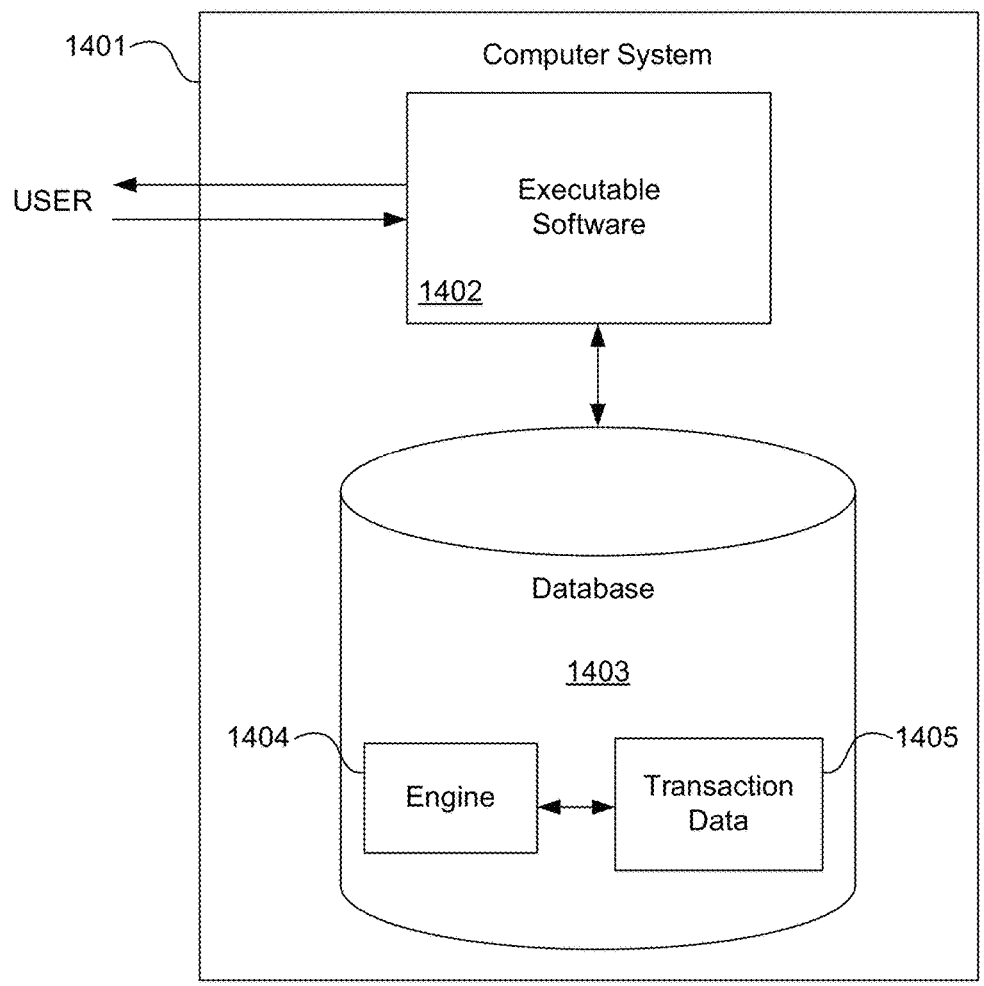
FIG. 14 illustrates hardware of a special purpose computing machine configured to implement query searching according to an embodiment.

FIG. 14 illustrates hardware of a special purpose computing machine configured to perform searching according to an embodiment. In particular, computer system 1401 comprises a processor 1402 that is in electronic communication with a non-transitory computer-readable storage medium 1403. This computer-readable storage medium has stored thereon code 1405 corresponding to transaction data including communities. Code 1404 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 1510 is illustrated in FIG. 15. Computer system 1510 includes a bus 1505 or other communication mechanism for communicating information, and a processor 1501 coupled with bus 1505 for processing information. Computer system 1510 also includes a memory 1502 coupled to bus 1505 for storing information and instructions to be executed by processor 1501, including information and instructions for performing the techniques described above, for example. This memory may also be used for storing variables or other intermediate information during execution of instructions to be executed by processor 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1503 may include source code, binary code, or software files for performing the techniques above, for example. Storage device and memory are both examples of computer readable mediums.

Computer system 1510 may be coupled via bus 1505 to a display 1512, such as a cathode ray tube (CRT) or liquid crystal display (LCD), for displaying information to a computer user. An input device 1511 such as a keyboard and/or mouse is coupled to bus 1505 for communicating information and command selections from the user to processor 1501. The combination of these components allows the user to communicate with the system. In some systems, bus 1505 may be divided into multiple specialized buses.

Computer system 1510 also includes a network interface 1504 coupled with bus 1005. Network interface 1504 may provide two-way data communication between computer system 1510 and the local network 1520. The network interface 1504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1510 can send and receive information, including messages or other interface actions, through the network interface 1504 across a local network 1020, an Intranet, or the Internet 1530. For a local network, computer system 1510 may communicate with a plurality of other computer machines, such as server 1515. Accordingly, computer system 1510 and server computer systems represented by server 1515 may form a cloud computing network, which may be programmed with processes described herein. In the Internet example, software components or services may reside on multiple different computer systems 1510 or servers 1531-1535 across the network. The processes described above may be implemented on one or more servers, for example. A server 1531 may transmit actions or messages from one component, through Internet 1530, local network 1520, and network interface 1504 to a component on computer system 1510. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
providing transaction data comprising a plurality of records including columns, and an index in a column-oriented in-memory database;
generating a graph from the transaction data;
applying an algorithm to the graph to create a graph community structure;
defining a plurality of communities in the transaction data using the graph community structure executed in parallel upon at least two of the columns;
executing a database query on records in a community, skipping records outside of the community;
evaluating the community based upon performance gains versus searching value identifiers across multiple communities, wherein the performance gains are in AND queries using intersecting attribute vector blocks of multiple columns;
based upon the evaluating, re-applying the algorithm independently to each column to create an alternative graph community structure for each column; and
displaying a search result resulting from re-executing the database query on records in an alternative community defined in the transaction data using the alternative graph community structure.

2. A method as in claim 1 wherein the graph is generated by identifying adjacent value occurrences in the transaction data, and creating an edge between a current index value and a previous index value.

3. A method as in claim 1 wherein the algorithm considers a modularity measure.

4. A method as in claim 1 wherein the transaction data is column-oriented data.

5. A method as in claim 1 wherein the algorithm is applied by an engine of the column-oriented in-memory database.

6. A non-transitory computer readable storage medium embodying a computer program for performing a method, said method comprising:
providing transaction data comprising a plurality of records including columns, in a column-oriented in-memory database;
generating a graph from the transaction data;
applying an algorithm to the graph to create a graph community structure;
defining a plurality of communities in the transaction data using the graph community structure executed in parallel upon at least two of the columns;
evaluating a community based upon performance gains versus searching value identifiers across multiple communities;
executing a database query on records in the community, skipping records outside of the community, wherein the performance gains are in AND queries using intersecting attribute vector blocks of multiple columns;

based upon the evaluating, re-applying the algorithm independently to each column to create an alternative graph community structure for each column; and displaying a search result resulting from re-executing the database query on records in an alternative community defined in the transaction data using the alternative graph community structure.

7. A non-transitory computer readable storage medium as in claim 6 wherein the graph is generated by identifying adjacent value occurrences in the transaction data, and creating an edge between a current index value and a previous index value.

8. A non-transitory computer readable storage medium as in claim 6 wherein the algorithm considers a modularity measure.

9. A non-transitory computer readable storage medium as in claim 6 wherein the transaction data is column-oriented data.

10. A non-transitory computer readable storage medium as in claim 6 wherein the algorithm is applied by an engine of the column-oriented in-memory database.

11. A computer system comprising:

one or more hardware processors;

a software program, executable on said computer system, the software program configured to cause the at least one or more hardware processors to:

provide column-oriented transaction data comprising a plurality of records including columns, in a column-oriented in-memory database;

generate a graph from the transaction data;

apply an algorithm to the graph to create a graph community structure;

define a plurality of communities in the transaction data using the graph community structure executed in parallel upon at least two of the columns;

evaluate a community based upon performance gains versus searching value identifiers across multiple communities;

execute a database query on records in the community, skipping records outside of the community, wherein the performance gains are in AND queries using intersecting attribute vector blocks of multiple columns;

based upon the evaluating, re-apply the algorithm independently to each column to create an alternative graph community structure for each column; and display a search result resulting from re-executing the database query on records in an alternative community defined in the transaction data using the alternative graph community structure.

12. A computer system as in claim 11 wherein the graph is generated by identifying adjacent value occurrences in the transaction data, and creating an edge between a current index value and a previous index value.

13. A computer system as in claim 11 wherein the algorithm considers a modularity measure.

* * * * *